March 14, 1939.                T. G. LOUIS                2,150,688
                                MAGNETO
                         Filed Aug. 20, 1937        2 Sheets-Sheet 1
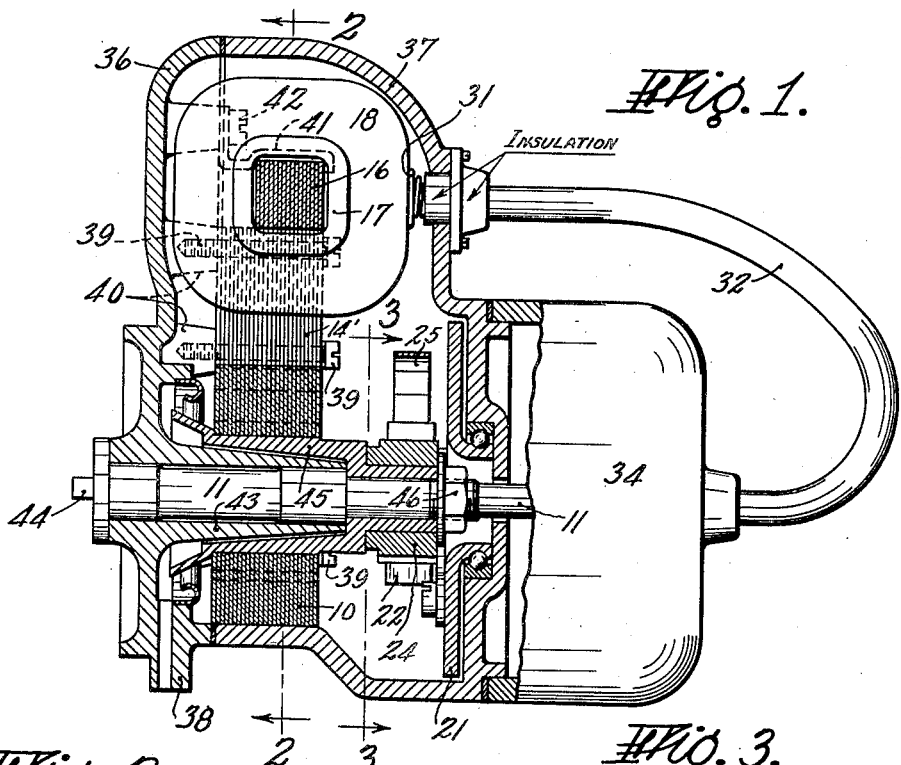
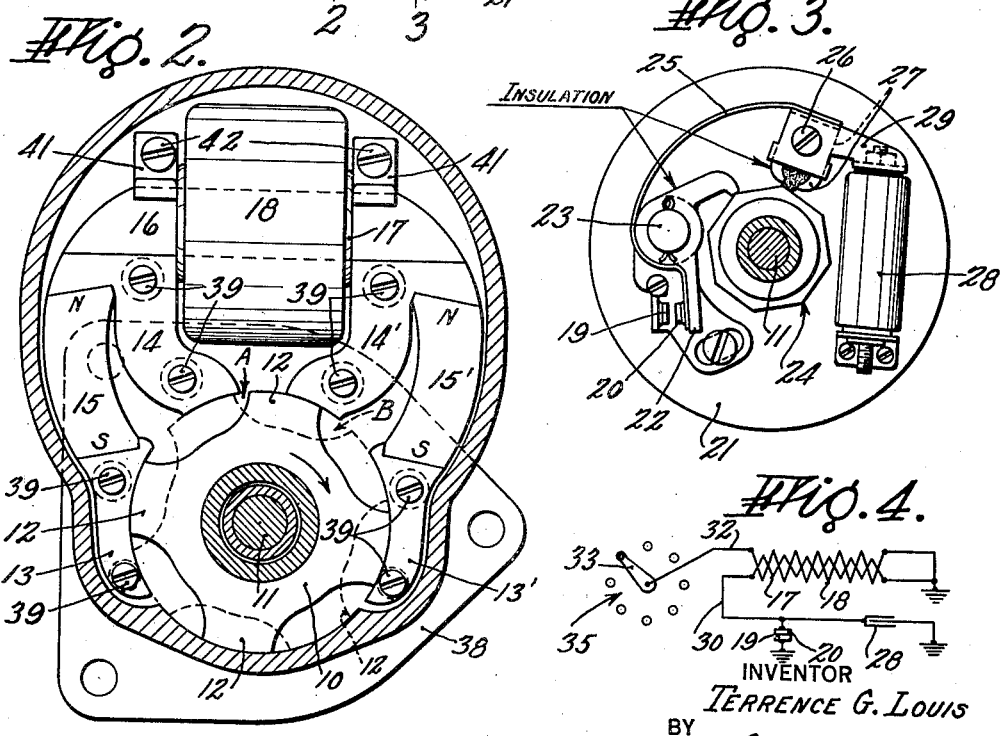
INVENTOR
TERRENCE G. LOUIS
BY
Chapin + Neal
ATTORNEYS March 14, 1939. T. G. LOUIS 2,150,688
MAGNETO
Filed Aug. 20, 1937 2 Sheets-Sheet 2
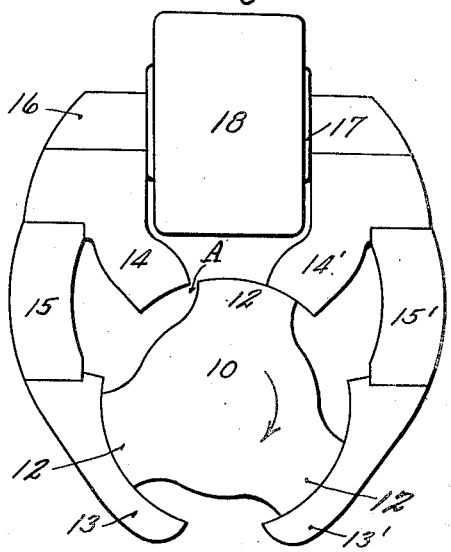
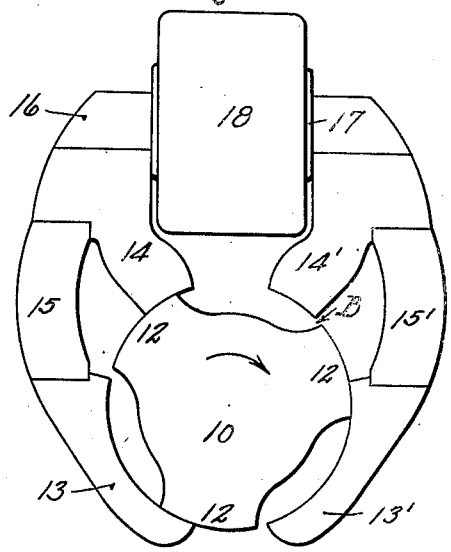
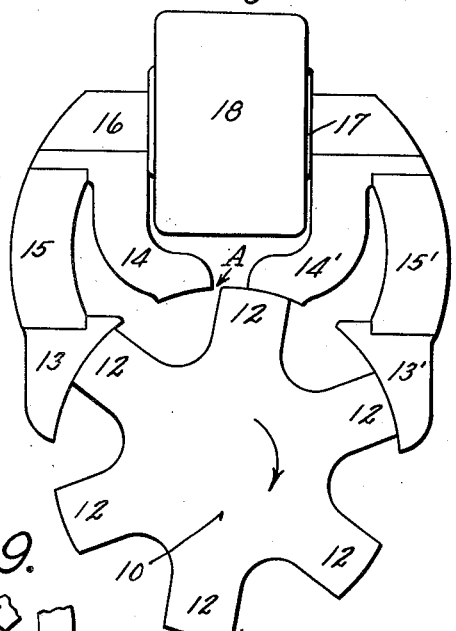
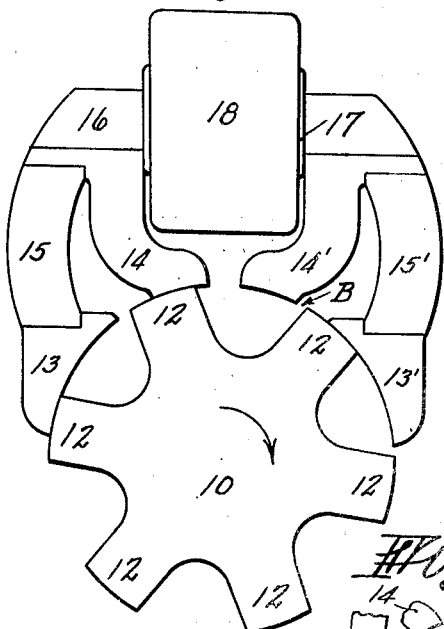
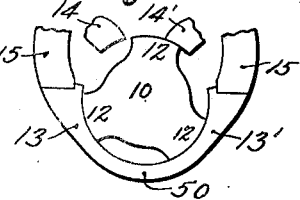
INVENTOR
TERRENCE G. LOUIS
BY
Chapin & Neal
ATTORNEYS Patented Mar. 14, 1939

2,150,688

UNITED STATES PATENT OFFICE 2,150,688

MAGNETO

Terrence G. Louis, West Springfield, Mass., assignor to Wico Electric Company, West Springfield, Mass., a corporation of Massachusetts Application August 20, 1937, Serial No. 160,017

10 Claims. (Cl. 171—209)

This invention relates to an improved high-tension magneto.

More particularly, the invention is directed to improvements in magnetos of that class in which the field magnets and generating coils, together with the cooperating pole pieces and core, are stationarily mounted so that the rotor carries neither magnets nor windings and may therefore consist simply of iron laminations and be of relatively small diameter and of relatively light weight. The invention is also directed to magnetos of that class wherein the rotor directs the flux, first in one and then in the opposite direction through the coil and cores, and causes a plurality of such flux reversals during each revolution,—such that the magneto may produce six, eight, twelve, or more sparks per revolution as desired for use with various multi-cylinder engines.

The invention has for an object to provide an improved arrangement of parts of the magnetic circuit in a magneto of the general class described, which arrangement enables all the necessary elements to be used in their cheapest forms, to the end that the magneto is adapted for production in quantities at low unit cost.

The invention has for another object to provide a compact arrangement of parts utilizing special magnets, very short in length but of exceedingly high coercive force, and enabling the magneto to be made of very small size without sacrifice to its efficiency.

The invention has for another object the provision of a magneto having an unwound, multi-lobed rotor, a generating coil and core therefor, together with permanent magnets of high coercive force and of such short length that they can be located entirely between two parallel planes, one of which passes through the axis of the rotor and the other of which passes through the axis of the core. With each magnet are associated two pole pieces, one of which is connected to the core and both of which cooperate with the lobes of the rotor. The arrangement is characterized in that it affords magnetic circuits of relatively short length and low reluctance from the magnets both through the coils and core and outside the same.

Other objects will appear as the detailed description proceeds and will be pointed out in the appended claims.

The invention will be disclosed with reference to the accompanying drawings, in which:

Fig. 1 is a sectional elevational view of a magneto embodying the invention;

Figs. 2 and 3 are cross sectional views thereof taken on the line 2—2 and 3—3 respectively, of Fig. 1;

Fig. 4 is a diagrammatical view showing the electrical connections;

Fig. 5 is a diagrammatical view of a modified form of the invention, suitable for ignition use in a six cylinder engine;

Fig. 6 is a view similar to Fig. 5 but showing the parts in different relative positions;

Fig. 7 is a diagrammatical view of another form of the invention, suitable for ignition use in a twelve cylinder engine;

Fig. 8 is a view similar to Fig. 7 but showing the parts in different relative positions; and Fig. 9 is a fragmentary diagrammatical view showing a modification in pole piece construction.

Referring to these drawings, and particularly to Fig. 2 thereof, the magneto includes an unwound rotor 10 fixed to a driving shaft 11 and having a plurality (four as shown herein) of radially projecting lobes 12 which are equally and angularly spaced about the periphery of the rotor. This rotor cooperates with two pairs of pole pieces. The pole pieces 13 and 13' of one pair are located in widely spaced and, in this particular case, in diametrically opposed relation and are relatively large in angular extent as compared to the pole pieces 14 and 14' of the other pair. The pole pieces 14 and 14' as herein shown, are spaced forty-five degrees apart and are located between the pole pieces 13 and 13',—both pole pieces 14 and 14' lying on the same side of the rotor. These pole pieces 14 and 14' are centralized with respect to a vertical plane passing diametrically through the axis of revolution of rotor 10. The pole pieces 13 and 13' are symmetrically spaced with respect to a horizontal plane passing through the axis of revolution of the rotor. The pole pieces of one pair are connected to the corresponding pole pieces of the other pair by permanent magnets 15 and 15'. The ends of like polarity of the magnets are connected to pole pieces of like pairs. Thus, the north pole of the magnets 15 and 15' are connected to the pole pieces 14 and 14', respectively, and the south poles are connected to the pole pieces 13 and 13', respectively. These magnets are straight bar magnets of very short length but of exceedingly high coercive force. They extend in directions substantially at right angles to the plane which bisects the pole pieces 13 and 13'. The two pole pieces 14 and 14' are interconnected by a core 16 and mounted on this core and located between the pole pieces 14 and 14' are generating windings including primary and secondary coils 17 and 18, respectively. The rotor, pole pieces and core are constructed of laminations in the usual way and provided magnetic circuits from the permanent magnets 15 and 15'.

The arrangement described is designed for supplying ignition for an eight cylinder engine and to produce eight sparks per revolution of the rotor. The magnets are utilized successively to supply flux through the core 16 and the coils thereon, first in one direction and then in the opposite direction. When one magnet is supplying flux through the core 16, the other magnet is short circuited and its flux shunted away from the core. Thus, the rotor 10, when positioned, as shown, establishes magnetic circuits through the pole piece 14' and has broken the magnetic circuits theretofore existing through pole piece 14. Flux from the north pole of magnet 15 will pass from left to right through core 16 and then through pole piece 14' and the rotor back to the south pole of magnet 15. At the same time, flux from the north pole of magnet 15' will pass through pole piece 14' and the rotor back to the south pole of magnet 15'. As the rotor moves into the dotted line position, the two magnetic circuits are broken and two others established through the pole piece 14. That is, the flux from the magnet 15' will pass from right to left through core 16 and the flux from magnet 15 will be shunted away from the core. The flux through core 16 is reversed eight times during each revolution of the rotor. At each reversal there is a break in a magnetic circuit and there are eight such breaks per revolution, each of which is utilized to produce an ignition spark. One such break is shown at A between one lobe 12 of the rotor and pole piece 14. The next break will be at B between the same lobe 12 of the rotor and the pole piece 14'. Succeeding lobes 12 of the rotor will each effect breaks in magnetic circuits first at A and then at B, so that the breaks occur at forty-five degree intervals.

The electrical provisions of the magneto are the usual ones. The primary coil 17 is included in an electrical circuit which is opened and closed under the control of a circuit breaker driven by or in timed relation with shaft 11. This breaker comprises breaker points 19 and 20, one of which as 19 is grounded to its support 21, and the other of which is carried on a lever 22 of insulating material pivoted on a stud 23 fixed to support 21. A cam 24 fixed to shaft 11 has eight projections which engage and move lever 22 to separate the points 19 and 20 eight times per revolution and synchronously with the eight breaks in the magnetic circuit. A spring 25 interconnecting the lever 22 and terminal 26 mounted on support 21 and insulated therefrom by a block 27 tends to hold the points 19 and 20 engaged and to move the lever against the cam and also as a conductor between the point 20 and terminal 26. A condenser 28 is also mounted on support 21 with one terminal in metallic connection therewith and the other terminal connected to terminal 26 through a conducting piece 29. A wire 30 leads from the latter to one terminal of primary coil 17 (Fig. 4). The other terminal of coil 17, together with one terminal of the secondary coil 18 is grounded. The other terminal of the secondary coil marked 31 is adapted for connection by a wire 37 to the brush 33 of the usual distributer which is housed within a case 34 and is not shown except diagrammatically at 35 in Fig. 4.

The elements described may be mounted and supported in any suitable way and the details of the mounting are not important nor essential to an understanding of the invention. For example, the parts may be mounted as shown in Fig. 1. The magnetic elements, coils, and timer are housed in a casing of non-magnetic metal, which casing consists of two sections 36 and 37 suitably fastened together. One section, as 36, has a flange 38 adapted to be secured to the crank case of an engine. The magnetic elements—the pole pieces 13, 13', 14 and 14' are secured in any suitable way, as for example by screws 39 to internal bosses, such as 40, on casing 36. The magnets are firmly clamped, one between the pole pieces 13 and 14 and the other between the pole pieces 13' and 14'. The core rests on top of the pole pieces 14 and 14' and is held in place by clips 41 and screws 42. The drive shaft 11 is rotatably mounted in a long bearing 43 formed in casing 36 and its other end 44 is shaped for a coupling engagement with some driving element within the engine crank case. The rotor is suitably fixed to a hub 45 which surrounds the sleeve and extends beyond the inner end of the same and is fixed to shaft 11. The cam 24 is fixed to the hub 45 by a nut 46. The shaft 11 extends into the distributer case 34 to drive the brush 33. The timer support 21 is mounted in casing 37 for angular adjustment about the axis of shaft 11. The means for moving the timer support to adjust the same have not been shown as they form no part of the present invention.

The pole pieces 13 and 13' need not necessarily be structurally separate and distinct as shown in Figs. 1 to 8 inclusive. They are of like polarity and may be connected together mechanically and also magnetically if desired, as shown diagrammatically in Fig. 9 by a portion 50. The magneto will function in the same way. The purpose of the pole pieces 13 and 13' is to maintain a connection between both magnets 15 and 15' and the rotor and this purpose may be accomplished whether the pole pieces 13 and 13' are separate or joined together and I intend that the phrase "pole piece means" shall cover either arrangement.

In operation, the shaft 11, being suitably driven in proper timed relation with the engine, the rotor 10 and timer cam 24 revolve synchronously and the former effects eight breaks per revolution in the magnetic circuit through core 16 and the latter a like number of breaks at substantially the same time in the normally closed electrical circuit which includes the primary coil 17. The two "break" positions for one lobe of the rotor (the uppermost lobe) are shown in Fig. 2. This uppermost lobe is shown in full lines, as having just created a break in the circuit from magnet 15' through the core and as having established a circuit from magnet 15 through the core. A little later in the clockwise rotation of the rotor, this same lobe will assume the position shown by dotted lines and break the circuit which it last established. Each lobe of the rotor functions in a similar way, cooperating first with pole piece 14 to make a magnetic circuit through the core and subsequently to break such circuit and then with the pole piece 14' to establish another circuit through the core and finally to break the second circuit. Thus, there are eight breaks per revolution in the magnetic circuit through core 16. Also, at each break there is a reversal of flux because each lobe directs the flux through the core first from one magnetic source in one direction and then from the other magnetic source in the other direction.

The invention is not limited to use on eight cylinder engines and is capable of use on multi-cylinder engines having a greater or a less number of cylinders. For example, Figs. 5 and 6 show diagrammatically a magneto designed for a six cylinder engine and Figs. 7 and 8 show a magneto designed for a twelve cylinder engine. The parts in Figs. 5 to 8, which correspond to parts described in the preceding figures have been given corresponding reference numerals. The six cylinder form and the twelve cylinder form are constructed and operate in the same general manner and the differences consist in the number of lobes 12 in the rotor and the spacing of the pole pieces 13, 13', 14 and 14'. For the six cylinder form, the rotor is provided with three lobes 12 and the pole pieces 14 and 14' are spaced sixty degrees apart. Each lobe 12, during each revolution, cooperates first with the pole piece 14' and then with the pole piece 14 to effect a change in the magnetic circuit through core 16 and since there are three lobes, six changes per revolution will be produced. The pole pieces 13 and 13' are moved downwardly or more widely spaced than before from the adjacent pole pieces 14 and 14' because of the wider spacing between successive lobes of the rotor. In the twelve cylinder form shown in Figs. 7 and 8 the rotor has six lobes 12 and the pole pieces 14 and 14' are spaced thirty degrees apart. Each lobe 12, as before, cooperates first with pole piece 14' and then with pole piece 14, once during each revolution, and since there are six lobes 12, twelve changes per revolution are effected in the magnetic circuit through core 16. It will be observed that in all three forms the number of rotor lobes is half the number of cylinders of the engine which the magneto is intended to serve and the angle between the pole pieces 14 and 14' is equal to 360 divided by the number of cylinders. Also that the angle between the leading ends of pole pieces 14' and 13' and between the trailing ends of pole pieces 14 and 13 is equal to the angle between successive lobes of the rotor. The breaker point cam 24 will, of course, have six equally spaced projections instead of eight for the form shown in Figs. 5 and 6 and twelve equally spaced projections for the form shown in Figs. 7 and 8. Similar changes would obviously have to be made in the distributer.

The magnets herein used, are of exceedingly short length. They are shown about four-fifths actual size in Fig. 2. Coercive force is secured by quality of the special steel used rather than by length and the magnets shown, although very short, are exceedingly powerful. The use of such short magnets enables the very compact arrangement illustrated. The coils and their core can be moved close to the rotor and the distance between the axis of the coil and the axis of the rotor can be materially reduced. By shortening this distance and by locating the short but powerful magnets entirely between two parallel planes,—one passing through the core axis and one through the rotor axis,—the length of the magnetic circuits is reduced to a very substantial extent and the reluctance of such circuits made very low. If, for example, long magnets had to be used and the short distance between the aforesaid axes were retained, the flux would have to be led back from one or both polar ends of the magnets to the core or to the pole piece 13 or both. The arrangement is therefore a very desirable one for efficiency as well as for compactness.

What I claim is:

1. A magneto, comprising, a rotatable flux distributer having a circular series of equally-spaced radially-extending lobes of like dimensions, each having an outer face coaxial with the axis of revolution of the distributer, a single core, a generating winding thereon, a pair of pole pieces connected to said core one near each end thereof and on opposite sides of said winding, said pole pieces extending from the core toward the distributer and toward one another with the inner extremities disposed in part between the winding and distributer, said extremities having faces for cooperation with said faces of the distributer, the faces of said pole pieces being spaced apart by a distance less than the width of the outer face of a lobe of the distributer, whereby each lobe before moving out of cooperative relation with one pole piece will move into cooperative relation with the other, a pair of short permanent magnets of high coercive force magnetically connected at one polar extremity one to each of said pole pieces and core ends, said polar extremities being of like polarity, and pole piece means connected to the other polar extremities of said magnets and mounted to cooperate with said faces of the lobes of said distributer, said lobes having an angular spacing and said pole piece means having a width such that two thereof will be moving in cooperative relation with the pole piece means during the interval while another lobe moves into and out of cooperative relation with one pole piece and then into and out of cooperative relation with the other pole piece.

2. A magneto, comprising, a rotatable flux distributer having a circular series of equally-spaced radially-extending lobes of like dimensions, each having an outer face coaxial with the axis of revolution of the distributer, a single core, a generating winding thereon, a pair of pole pieces connected to said core one near each end thereof and on opposite sides of said winding, said pole pieces extending from the core toward the distributer and toward one another with the inner extremities disposed in part between the winding and distributer, said extremities having faces for cooperation with said faces of the distributer, the faces of said pole pieces being spaced apart by a distance less than the width of the outer face of a lobe of the distributer, whereby each lobe before moving out of cooperative relation with one pole piece will move into cooperative relation with the other, a pair of short permanent magnets of high coercive force magnetically connected at one polar extremity one to each of said pole pieces and core ends, said polar extremities being of like polarity, and pole piece means connected to the other polar extremities of said magnets and mounted to cooperate with said faces of the lobes of said distributer, said lobes having an angular spacing and said pole piece means having a width such that two thereof will be moving in cooperative relation with the pole piece means during the interval while another lobe moves into and out of cooperative relation with one pole piece and then into and out of cooperative relation with the other pole piece, the last-named polar extremities of said magnets being located between said core and a plane which lies parallel to the core and passes axially through said flux distributer.

3. A magneto, comprising, a rotatable flux distributer having a circular series of equally-spaced radially-extending lobes of like dimensions, each having an outer face coaxial with the axis of revolution of the distributer, a single core, a generating winding thereon, a pair of pole pieces connected to said core one near each end thereof and on opposite sides of said winding, said pole pieces extending from the core toward the distributer and toward one another with the inner extremities disposed in part between the winding and distributer, said extremities having faces for cooperation with said faces of the distributer, the faces of said pole pieces being spaced apart by a distance less than the width of the outer face of a lobe of the distributer, whereby each lobe before moving out of cooperative relation with one pole piece will move into cooperative relation with the other, a pair of short permanent magnets of high coercive force magnetically connected at one polar extremity one to each of said pole pieces and core ends, said polar extremities being of like polarity, and pole piece means connected to the other polar extremities of said magnets and mounted to cooperate with said faces of the lobes of said distributer, said lobes having an angular spacing and said pole piece means having a width such that two thereof will be moving in cooperative relation with the pole piece means during the interval while another lobe moves into and out of cooperative relation with one pole piece and then into and out of cooperative relation with the other pole piece, said magnets located wholly between two parallel planes one of which passes axially through said core and the other of which passes axially through the flux distributer.

4. A magneto, comprising, a revoluble flux distributer having a plurality of equally spaced radially projecting lobes of equal width, a core, a generating winding thereon, a pair of pole pieces connected to said core one near each end thereof and on opposite sides of said winding, said pole pieces extending from the core toward the distributer and toward one another with their inner extremities lying in part between said winding and distributer and in position for cooperation with said lobes, said pole pieces being separated by a distance less than the width of a distributer lobe, a pair of short permanent magnets of high coercive force magnetically connected at one polar extremity one to each of said pole pieces and core ends, said polar extremities being of like polarity, said magnets extending from the same side of said core as said pole pieces toward the distributer and terminating short of a plane passing axially through the distributer and parallel with the axis of said core, the inner extremities of both pole pieces located between the magnets, and pole piece means for maintaining at all positions of the distributer magnetic connection between the distributer and the ends of opposite polarity of both magnets.

5. In a magneto, generating coils, a core therefor, a revoluble flux distributer, a first pair of pole pieces mounted in cooperative relation with said distributer and symmetrically spaced with reference to a plane passing through the axis of rotation of the distributer and parallel to the axis of said core, a second pair of pole pieces mounted between the pole pieces of the first-named pair and between the distributer and core, the pole pieces of the second pair being connected to said core, one on each side of said coils and extending into cooperative relation with said distributer, and permanent bar magnets of relatively short length and high coercive force magnetically connecting the first-named pole pieces to said core, one on each side of said coils, said magnets being located wholly between the first-named plane and a parallel plane passing through the axis of the core, the ends of one polarity of said magnets being connected to the core and the ends of opposite polarity being connected to the first-named pole pieces.

6. In a magneto, a revoluble flux distributer, a first pair of pole pieces mounted in cooperative relation with respect to the distributer one on each side thereof and centralized with respect to a plane passing diametrically through the axis of the distributer, a core extending parallel to said plane, a second pair of pole pieces connected to said core, one near each end thereof and extending into cooperative relation with the distributer at angularly spaced locations intermediate the first-named pole pieces, a generating coil on said core between said second pair of pole pieces, and a pair of relatively short bar magnets, each connecting one first-named pole piece to one second-named pole piece and located wholly between said core and plane, said magnets having ends of the like polarity connected to like pole pieces.

7. In a magneto, a revoluble flux distributer, a pair of pole pieces mounted in cooperative relation wtih respect to the distributer, one on each side thereof and centralized with respect to a plane passing diametrically through the axis of the distributer, a core extending parallel to said plane, a second pair of pole pieces connected to said core, one near each end thereof and extending into cooperative relation with the distributer at angularly spaced locations intermediate the first named pole pieces, a generating coil on said core between said pole pieces, and a pair of relatively short bar magnets of high coercive force, each connecting one first-named pole piece to one second-named pole piece and located wholly between said core and plane and substantially at right angles thereto, said magnets having ends of the like polarity connected to like pole pieces.

8. In a magneto, a revoluble flux distributer having a plurality of equally spaced radial lobes, a pair of pole pieces for cooperation with said lobes mounted in relatively widely-spaced angular relation, a second pair of angularly spaced pole pieces located between the first-named pole pieces and both on the same side of the axis of the distributer, a pair of short bar magnets of high coercive force each connecting one first-named pole piece to one second-named pole piece, said magnets having like polar ends connected to like pole pieces, a core located on said side of the axis of the distributer and interconnecting the second-named pole pieces, and a generating coil on said core and between the second-named pole pieces, said magnets located entirely between two parallel planes one of which passes through said core and the other through the axis of said distributer.

9. In a magneto, a revoluble flux distributer having a plurality of radially projecting lobes, a pair of relatively widely spaced pole pieces, a second pair of relatively closely spaced pole pieces located intermediate the first pair of pole pieces, a core bridging the second pair of pole pieces, a generating coil on the core and between the pole pieces of the second pair, and a pair of short permanent magnets of high coercive force connecting one pole piece of the first-named pair to the adjacent pole piece of the second-named pair, said magnets having ends of like polarity connected to pole pieces of like pairs, said magnets being located entirely between two parallel planes, one passing axially through the core and the other through the axis of revolution of the distributer.

10. In a magneto, a revoluble distributer having a plurality of radially projecting lobes, a pair of relatively widely spaced pole pieces, a second pair of relatively closely spaced pole pieces located intermediate the first pair of pole pieces, a core bridging the second pair of pole pieces, a generating coil on the core and between the pole pieces of the second pair, and a pair of short permanent magnets of high coercive force connecting one pole piece of the first-named pair to the adjacent pole piece of the second-named pair, said magnets having ends of like polarity connected to pole pieces of like pairs, said magnets being located entirely between two parallel planes, one passing axially through the core and the other through the axis of revolution of the distributer, said lobes arranged so that two thereof successively and magnetically interconnect the first-named pole pieces while another magnetically connects first with one and then with the other of the second-named pole pieces.

TERRENCE G. LOUIS.